(12) United States Patent
Stallman et al.

(10) Patent No.: US 11,350,024 B1
(45) Date of Patent: May 31, 2022

(54) HIGH SPEED CONTINUOUSLY ADAPTIVE FOCUS AND DEBLUR

(71) Applicant: Amazon Technologies, Inc., Seattle, WA (US)

(72) Inventors: Timothy Stallman, Groton, MA (US); Frank Preiswerk, Brooklyn, NY (US); Michael R Calder, Westborough, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/192,392

(22) Filed: Mar. 4, 2021

(51) Int. Cl.
*H04N 5/225* (2006.01)
*H04N 5/232* (2006.01)
*G02B 3/14* (2006.01)

(52) U.S. Cl.
CPC ......... *H04N 5/232121* (2018.08); *G02B 3/14* (2013.01); *H04N 5/23218* (2018.08); *H04N 5/23251* (2013.01); *H04N 5/23267* (2013.01)

(58) Field of Classification Search
CPC ....................... G06K 7/10861; G06K 7/10821
See application file for complete search history.

(56) References Cited

U.S. PATENT DOCUMENTS

| | | | | |
|---|---|---|---|---|
| 2013/0113919 A1* | 5/2013 | Qiao | ...................... | G01N 21/95 348/92 |
| 2014/0021259 A1* | 1/2014 | Moed | ...................... | G01B 11/06 235/472.01 |
| 2014/0036135 A1* | 2/2014 | Gehring | ............. | H04N 5/23212 348/345 |
| 2014/0055662 A1* | 2/2014 | Torabi | .............. | H04N 5/232123 348/345 |
| 2014/0098220 A1* | 4/2014 | Nunnink | .......... | H04N 5/232121 348/135 |
| 2014/0347473 A1* | 11/2014 | Wolff | ...................... | G06T 5/005 348/135 |
| 2018/0324349 A1* | 11/2018 | Kim | ....................... | G03B 15/16 |
| 2019/0251312 A1* | 8/2019 | Schneider | .......... | G06K 7/10811 |
| 2020/0034591 A1* | 1/2020 | Bachelder | ........ | H04N 5/232125 |
| 2020/0059594 A1* | 2/2020 | Olbrich | .................. | H04N 5/142 |
| 2020/0404162 A1* | 12/2020 | Uno | ....................... | H04N 5/238 |
| 2021/0142022 A1* | 5/2021 | Oka | ...................... | G06K 7/1443 |

* cited by examiner

*Primary Examiner* — James M Hannett
*Assistant Examiner* — Dwight Alex C Tejano
(74) *Attorney, Agent, or Firm* — Kilpatrick Townsend & Stockton LLP (57) ABSTRACT

Image data from a camera is used to identify one or more items in a dynamic field of view for item identification and tracking. The camera focus setting may be adjusted to different depth of field based on estimated distances to the items within the image data. After adjusting the focus setting, additional image data may be collected to capture a sharper image of the item and ensure sufficient clarity for item recognition based on item identifiers visible on the items within the image data.

20 Claims, 8 Drawing Sheets

HIGH SPEED CONTINUOUSLY ADAPTIVE FOCUS AND DEBLUR

BACKGROUND

Typical item tracking systems, such as for inventory and shipping centers rely on item identification labels or markers. The labels must typically be presented explicitly to a label reader, introducing additional steps and slowing down processing by requiring particular placement and orientation of the items. Some solutions for item tracking involve optical sensors to capture image data or information from the labels.

Optical systems have limited depth of field, the distance at which image data produces sharp images of objects. Focus may be changed for lenses, but typically requires mechanical components that require time to adjust the depth of field as needed. Due to these depth of field limitations, optical item identification systems typically require item labels to be at a predefined distance and location for imaging such that item labels are in focus.

BRIEF DESCRIPTION OF THE DRAWINGS

Various embodiments in accordance with the present disclosure will be described with reference to the drawings, in which.

DETAILED DESCRIPTION

Examples described herein are directed to, among other things, techniques for continuously adaptive focus and deblur to enable item identification during item transit. During item processing or movement, objects may transit through an area at a variety of distances from an imaging device and, due to depth of field limitations of optical sensors, items may be in or out of focus based on a distance from the imaging device and the current focus settings of the imaging device. A typical solution for capturing images of items useful for item identification involves routing all items through a particular region at a set distance from the imaging device, such that the item falls within a preset focus region of the imaging device. Such typical solutions severely limit options for item identification as item must be routed through a narrow window, as such, situations where items may traverse an area at varying depths or distances from the imaging device would not be suitable for such item identification systems. However, sorting, picking, transportation, and other such systems and regions of a facility may not be suitable for routing all items through a narrow zone, which introduces a bottleneck and slows processing of items, requiring each item to be presented in a particular manner. Such typical solutions rely on optical identifiers, such as barcodes, QR codes, item color, physical attributes of items, general shapes, and the like, and either require a user to manually scan each optical identifier or, in automated systems, use a large number of optical readers to scan the optical identifiers across a depth of field, such as across a sorting room or shipping facility. In contrast, the techniques and systems described herein provide for continuously adaptive image sensing systems to capture sharp images useful for item identification without requiring particular item positions and enabling identifications of items in a dynamic region at or near real-time across a large depth of field not possible using existing systems without significantly slowing processing or implementing large numbers of scanners.

Though the techniques and systems described herein are may be described with respect to processing of items or packages in a facility, the techniques and systems described herein are applicable to image capture in dynamic regions including identification of license plates in parking lots, in or around robotic devices that transport items, capturing images of individuals in a region (such as to capture image data of a plurality of individuals using a single user device camera lens with each individual captured in focus), face identification of individuals, or any other dynamic regions where sharp image data may be desired or required for any application.

In the systems described herein, imaging devices may be employed that have a fast (several milliseconds) response time to adjust focus. One example of such an imaging device is an imaging device including a liquid lens. Liquid lenses include an interface between two fluids having dissimilar optical indices. The shape of the interface can be changed by the application of external forces, such as a voltage, so that light passing across the interface can be directed to propagate in desired directions. As a result, the optical characteristics of a liquid lens, such as whether the lens operates as a diverging lens or as a converging lens, and its focal length, can be changed in response to the applied forces in a matter of a few milliseconds. The fast reaction time of liquid lens technology, or other such lenses having focus reaction times on the same order or faster than the liquid lenses enables continuously adaptive focus to ensure image data of a dynamic region captures an item with sufficient clarity for item identification. Further still, due to the nature of a dynamic region, a one-dimensional sensor, such as a distance sensor, fails to ensure the item is in focus, or the imaging device has a proper focus setting if the item is in motion, as the one-dimensional sensor measures along a single axis and does not track the item in the field of view. Two-dimensional depth sensors require post-processing time that precludes their use in determining a distance to an item in time to adjust a focus setting before the item potentially leaves the field of view. Additionally, two-dimensional depth sensors are hindered by relatively low in-plane resolution that makes item identification difficult. The techniques and systems described herein do not require a depth sensor and instead relies on known item characteristics to determine a distance to the item and thereby set the focal distance of the imaging device. The techniques described herein are continuously adaptive, and may be iterated and performed continuously or iteratively to maintain an item in sharp, clear focus for object identification from image data.

The techniques described herein begin by first acquiring a (potentially unfocused) image at any focus setting. The first image is fed to a machine learning model that outputs the estimated item size in the image. The model is trained to estimate the size of the item of interest, for example a shipping label, license plate, a package, a face of a person or other such known item size. Since the true item size is known, the distance from the item to the imaging device may be calculated and the focal distance of the imaging device adjusted. The next image acquisition yields a sharp image of the object. The sharp image may be used to uniquely identify the item by reading an optical identifier or some characteristic of the item for use in item, object, and face identification and tracking.

Turning now to a particular example, in a processing center for packing and shipping of items, items may be picked from shelves and delivered in totes to a transfer location. At the transfer location the items may be removed from totes by operators or through robotic actuators and placed on a subsequent processing device. The items may vary over a large range in shape, size, or configuration. Due to the variation in the items and variations in ways that operators or robotic actuators may grasp and transport the items, the items may not all pass through a single location suitable for typical image-based item identification systems. For example, a six-axis robotic arm may move objects between positions through a variety of paths, just as an operator may as well. In this particular example, an imaging device positioned such that the field of view captures the transition zone may have a range of possible depths of field to cover the entire transition zone, though optical device limitations may prevent the entire transition zone from being in focused view of the imaging device at the same time.

As items are moved through the transition zone, the imaging device may capture first image data at a first focal setting of the imaging device, the first image data may be blurry and unclear and insufficient to uniquely identify an item identity. A shipping label or inventory label applied to the item may be visible, albeit in a blurry manner, in the image data. The shipping label may have a known size, for example if the facility uses a standard label size, the label will be of a known size. The size of the label from the first image data may be correlated with the known size of the label to produce a distance estimate to the item based solely on the first image data. The focal setting of the imaging device may be adjusted based on that distance estimate and capture second image data. Due to the rapid rate of focal distance adjustment of a liquid lens of the imaging device, the item will not likely have traversed a great distance between the two images and therefore the second image data will be sharp and clear to clearly identify a marker of the label and identify a unique identify of the item.

In some case, such as for quickly moving targets, the second image data may still be blurred because of system latency, causing objects to move out of focus by the time the focus-corrected (second) image is acquired. An iterative motion-predictive scheme predicts the distance of the item based on the two captured images and captures third image data based on the predicted distance to ensure the item is in focus, even for rapidly moving items. Following the second image data gathering above, and based on estimated object distance and speed between the first and the second image data, a predictive model estimates object position (distance to imaging device) and estimated focus for subsequent image data.

In some cases, further refinement of distance estimation to set focal distance may still not be sharp enough for applications like barcode decoding. Due to high throughput and in order to preserve computing resources, a machine learning algorithm may receive inputs from the second image data, or subsequent image data (e.g. the last estimated focus values) and maintains priority lists of deblur parameters. Depending on available computing resources, one or more deblurring algorithms may be performed on the image data. The system may also divide the frame into discrete elements and perform the deblurring algorithm on segments of the image data in parallel using a Graphics Processing Unit (GPU) to further reduce processing time for image deblurring.

The techniques and systems described herein provide several advantages over conventional optical item identification systems and techniques. For example, the techniques described herein enable item identification of objects in a dynamic region having a large depth of field without requiring additional resources, such as additional imaging devices or two-dimensional depth sensing and computing intensive processing associated therewith. The techniques also enable capturing of sharp images of items in motion, including accelerating items, without requiring a single pathway or additional steps by an automated process or user to ensure items are properly scanned and identified before proceeding.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
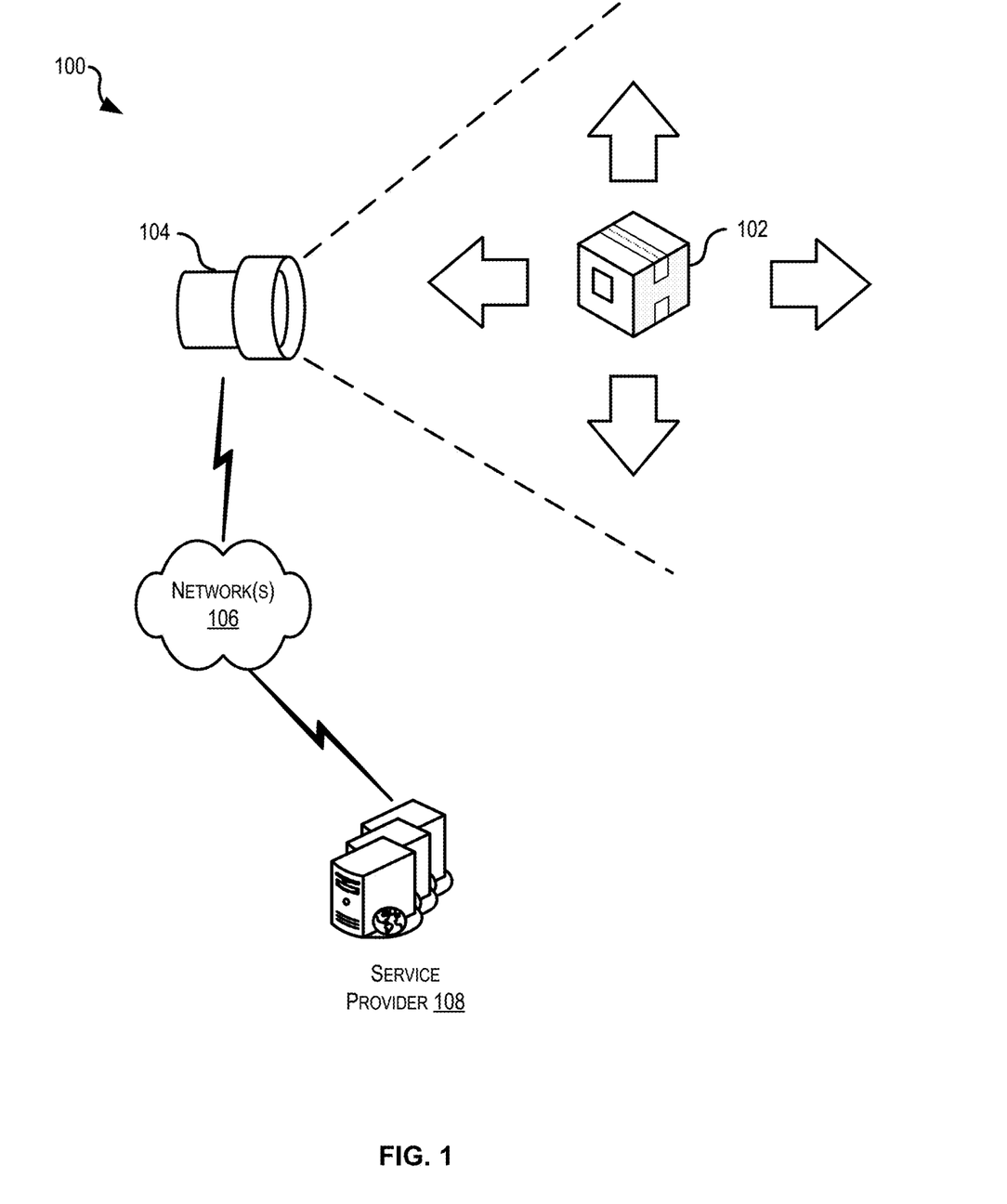
FIG. 1 is an example block diagram showing elements of a continuously adaptive focus and deblur system for item identification, according to at least one example.

Turning now to the figures, FIG. 1 is an example diagram 100 showing elements of a continuously adaptive focus and deblur system for item identification, according to at least one example. The diagram 100 includes an imaging device 104 with a field of view including a dynamic range where items 102a and 102b may be positioned, transit through, or otherwise be present for at least some threshold of time. The imaging device 104 may, for example, be positioned at or near a packing station where items are packed for shipment or loaded into a transportation vehicle. The imaging device 104 may capture image data of the items 102a and 102 as they are packed, loaded, or otherwise processed. In some examples, the imaging device 104 may be one of several imaging devices positioned to capture image data of the region from different angles, such as from different sides or above the region to ensure items are visible by one or more of the imaging devices as movement occurs within the region.

The imaging device 104 may include a liquid lens that uses a voltage applied to an oil-water membrane. The voltage applied to the oil-water membrane yields extremely fast reaction times for changing a shape and therefore a focal distance of the liquid lens on the order of a few milliseconds. In some examples, the imaging device 104 may include a mechanical lens or any other suitable lens capable of rapid reaction times on a similar order of magnitude with the liquid lens.

The imaging device 104 is in communication, over network 106, with a service provider 108 and communicated image data captured by the imaging device 104 to the service provider 108. The network 106 may include any suitable communication link including but not limited to wireless networks, wired data links (e.g., a universal serial bus connection), communications over the internet, and other such communication networks. The service provider 108 may include one or more computing resources to perform techniques described herein relating to determining focus settings for the imaging device 104 and instructing the imaging device 104 to adjust focus settings. The service provider 108 may also include resources or modules capable of performing image processing, including deblurring algorithms on image data from the imaging device 104 to increase a contrast or sharpness of the image data for use in item identification. The service provider 108 may also perform item recognition on the image data using object recognition techniques on the image data, either as received from the imaging device 104 or output by a deblurring algorithm.

In operation, the imaging device 104 captures image data of one or more items 102 that may be stationary or moving within the field of view at a first focus setting. At the first focus setting, the item 102 may be out of focus and therefore an object recognition or optical code reader may fail to identify or read a code positioned on the item 102. The image data may include a label or other known entity associated with the item 102 that is visible, albeit blurry. The label or other known entity may include a shipping label, an inventory label, a marker, a container, or any other object associated with the item 102 that corresponds to a known size, such as dimensions of a shipping label that are previously known.

The service provider 108 may identify the label in the image data and estimate a distance of the label from the imaging device 104 at the time the image data is gathered. The distance may be estimated using the known size of the label and the size of the item within the image data. For example a shipping label may be four inches by six inches and may be visible within the image data, but appear to be two inches by three inches. The apparent size of the shipping label in the image data is directly related to the distance from the imaging device 104 at a known proportion, that scales with distance. Accordingly, the service provider 108 may determine the distance to the item based on the scaling of the label within the image data when compared against the known dimensions of the label at a distance of zero from the imaging device 104.

After determining the distance to the item 102, the service provider 108 determines a focus setting for the imaging device 104 and instructs the imaging device 104 to adjust the focus setting and capture second image data. The second image data including the item 102 is captured within a small time period following the first time window such that changes in distance to the item 102 from the imaging device 104 are small and likely to fall within the depth of field of the second focus settings. The item 102 may then be identified based on the label 110, using image recognition or optical reading technology from the second image data.

In some examples, the item 102 may move at a rate such that the second image data is blurred with respect to the item, to an extent that the item cannot be identified readily. In such examples, the service provider 108 may perform a further iteration of the focus setting determination described above. In some examples, the service provider 108 may also implement additional techniques to capture sharp image data. For example, the service provider 108 may implement a deblurring algorithm to the second image data or may predict a future distance of the item 102 based on a speed of the item 102 determined between the first and second image data. The speed of the item 102 may be determined based on a time difference between the first and the second image data as well as the estimated distance of the item 102 associated with each set of image data. Using the speed information, the service provider 108 may determine a predicted distance of the item 102 at a third (future) time, determine a focus setting based on the predicted distance, set the focus setting of the imaging device 104, and receive third image data at the third time. In some examples, the service provider 108 may implement one or more of the techniques, for example, by processing the third image data using a deblurring algorithm.

The service provider 108, may, following the capture of sharp image data, identify the item 102. The item may be identified using the optical code, label, characteristic of the item 102, or any other distinguishing feature. The service provider 108 may further update a status, location, position, or other information related to the item 102, for example by updating a status of a package, indicating that the package has been loaded on a delivery vehicle.

Figure 2:
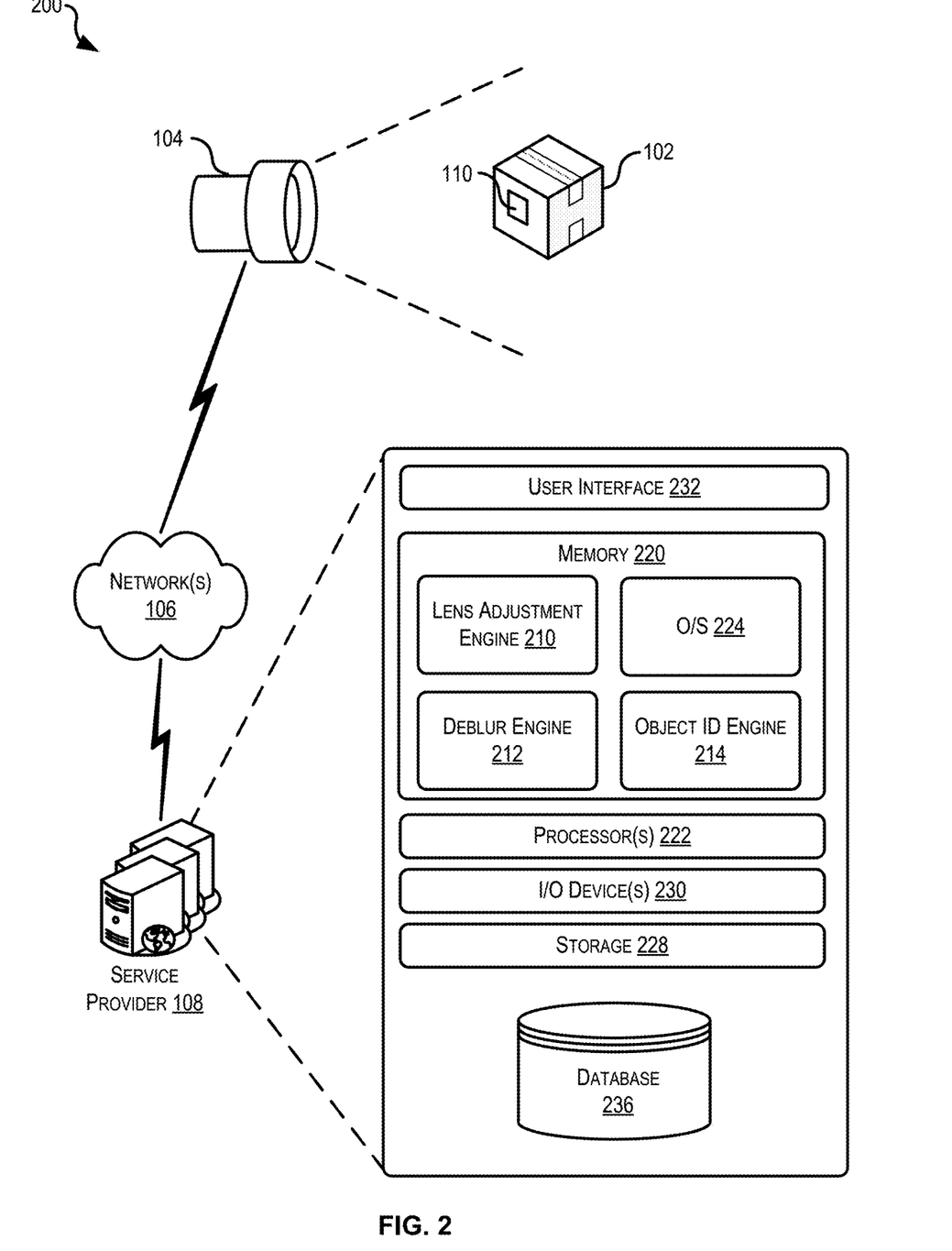
FIG. 2 is an example schematic architecture for implementing techniques relating to continuously adaptive focus and deblur for item identification, according to at least one example.

FIG. 2 is an example schematic architecture for implementing techniques relating to continuously adaptive focus and deblur for item identification, according to at least one example. The architecture 200 may include the service provider 108 in communication with one or more imaging devices 104 as described with respect to FIG. 1 above, via one or more networks 106. The item 102 includes a label 110, such as a shipping, storage, inventory, marker, or other identifying label visible by the imaging device 104. The label 110 may be of a known size, such as a consistent, known size, or part of a set of known sizes such as part of a suite of labels.

Turning now to the details of the service provider 108, the service provider 108 may include one or more service provider computers, perhaps arranged in a cluster of servers or as a server farm, and may host web service applications. The function of the service provider 108 may be implemented a cloud-based environment such that individual components of the service provider 108 are virtual resources in a distributed environment.

The service provider 108 may include at least one memory 220 and one or more processing units (or processor(s)) 222. The processor 222 may be implemented as appropriate in hardware, computer-executable instructions, software, firmware, or combinations thereof. Computer-executable instruction, software, or firmware implementations of the processor 222 may include computer-executable or machine-executable instructions written in any suitable programming language to perform the various functions described. The memory 220 may include more than one memory and may be distributed throughout the service provider 108. The memory 220 may store program instructions that are loadable and executable on the processor(s) 222, as well as data generated during the execution of these programs. Depending on the configuration and type of memory including the service provider 108, the memory 220 may be volatile (such as RAM and/or non-volatile (such as read-only memory ("ROM"), flash memory, or other memory). The memory 220 may include an operating system 224 and one or more application programs, modules, or services for implementing the features disclosed herein including at least a lens adjustment engine 210, a deblur engine 212, and an object identification ("ID") engine 214.

The service provider 108 may also include additional storage 228, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 228, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the service provider 108 or any associated user device in communication over network 106.

The service provider 108 may also include input/output (I/O) device(s) and/or ports 230, such as for enabling connection with a keyboard, a mouse, a pen, a voice input device, a touch input device, a display, speakers, a printer, or other I/O device.

In some examples, the service provider 108 may also include one or more user interface(s) 232. The user interface 232 may be utilized by an operator, curator, or other authorized user to access portions of the service provider 108. In some examples, the user interface 232 may include a graphical user interface, voice interfaces, web-based applications, programmatic interfaces such as APIs, or other user interface configurations. The service provider 108 may also include the database 236. In some examples, the database 236 may include one or more databases, such as database 236, or the like for storing and/or retaining information associated with the service provider 108. Thus, the database 236 may include data structures, such as a user information database, item catalog with identifier codes, focal distance setting data, label size data, and other such information.

The lens adjustment engine 210 may include one or more modules or elements for performing calculations and adjusting settings of the imaging device 104, such as the focal distance of a lens. The lens adjustment engine 210 may be capable of performing some or all of the processes illustrated in FIGS. 3-5. The lens adjustment engine 210 may include one or more algorithms or sub-elements capable of determining the estimated distance to the item 102 based on the apparent size of the label 110 in the image data. The lens adjustment engine 210 may also access lens setting information, such as focal distance settings and corresponding applied voltages for liquid lenses or stop settings for mechanical lenses, from the database 236 and determine focus settings based on the estimated distance and the stored settings of the lens of the imaging device 104. The lens adjustment engine 210 may further be configured with software or hardware elements capable of determining item speed between image frames, such as between a first and a second set of image data. The lens adjustment engine 210 may further be capable of instructing, over network 106, the imaging device 104 to reconfigure according to a new focus setting.

Figure 6:
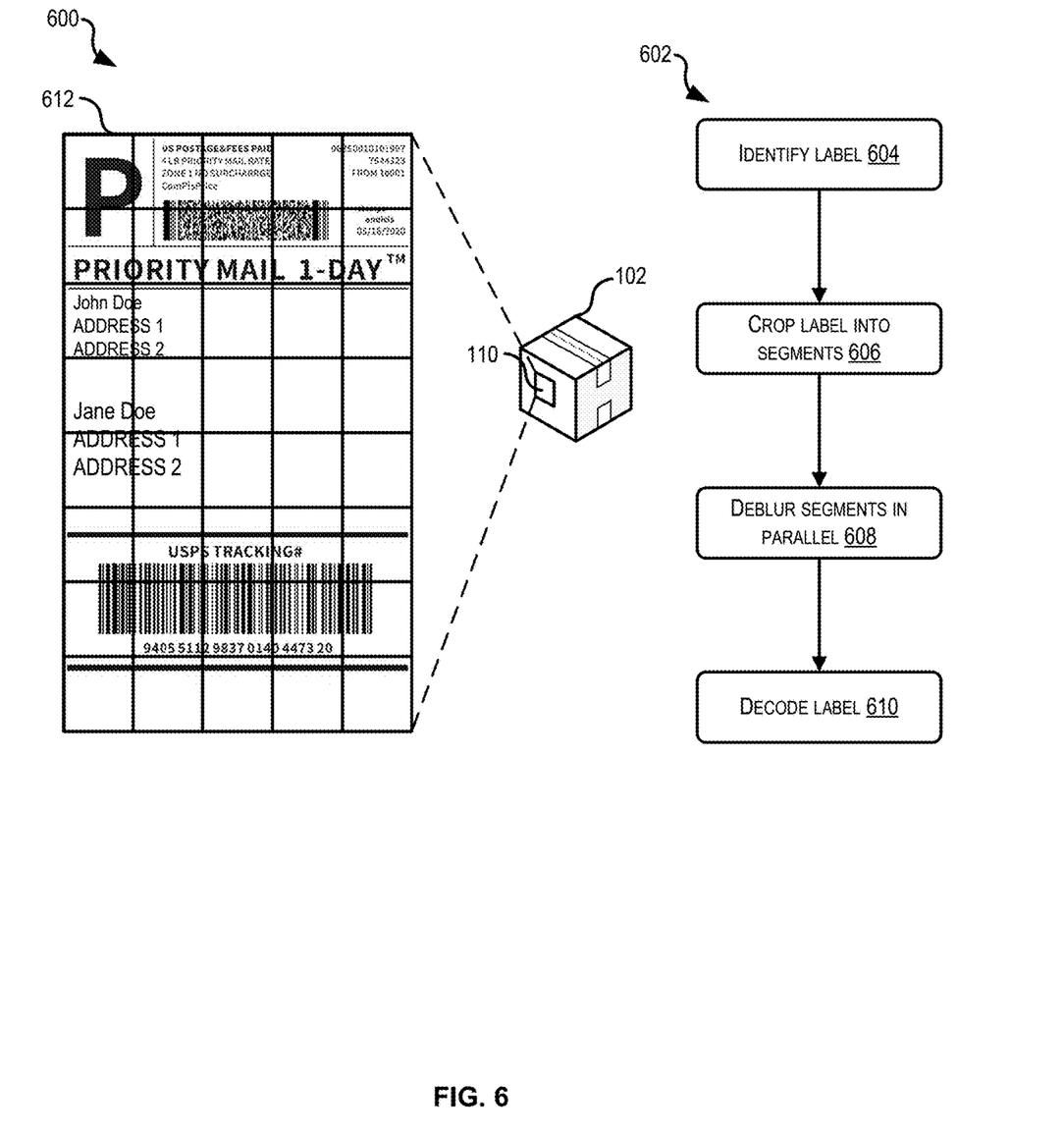
FIG. 6 is an example item label and associated flowchart showing a process for processing the item label using a deblurring algorithm, according to at least one example.

The deblur engine 212 may include one or more modules for post-processing of image data to sharpen data using post-processing techniques, including image sharpening algorithms, deblurring algorithms, machine learning algorithms, and other such techniques, for example as described with respect to FIG. 6.

The object ID engine 214 may include one or more modules for identification of objects 102, such as packages, inventory items, license plates, faces of individuals, and other such objects based on image data. For example, the object ID engine 214 may scan image data to identify optical markers or other identifying information and access database 236 to determine an identity of the item 102. The object ID engine 214 may also be capable of storing information in database 236 associated with item 102, such as an updated location, item contents (as items are packed into a box), or other such information.

In some examples, the object ID engine 214 may be configured to perform one or more additional actions in addition to identification, for example any suitable downstream purpose involving the focused image data may be implemented by the object ID engine 214 or any other component herein. For example, the object ID engine 214 may be used for tracking, updating locations, generating notifications, communications, security purposes, and other such downstream uses.

FIGS. 3-7 illustrate example flow diagrams showing processes 300, 400, 500, 602, and 700 as described herein. The processes 300, 400, 500, 602, and 700 are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes 300, 400, 500, 602, and 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 3:
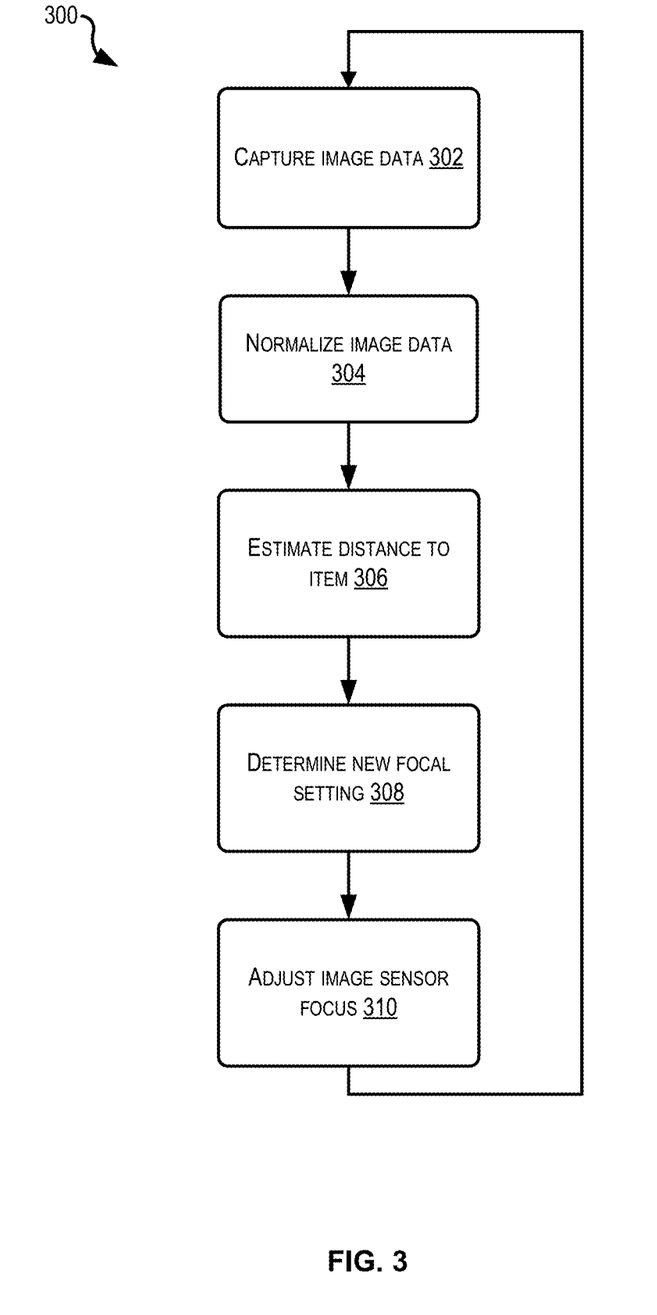
FIG. 3 is a flow diagram for a process to adaptively adjust imaging device focus settings based on a known item size, according to at least one example.

FIG. 3 is a flow diagram for a process 300 to adaptively adjust imaging device focus settings based on a known item size, according to at least one example. The process 300 may be carried out by the service provider 108, and specifically may be performed by the lens adjustment engine 210.

The process 300 may begin at 302 with the imaging device 104 capturing image data. The service provider 108 receives the image data from the imaging device 104. The image data may include a single frame or a series of frames, such as a video stream. The image data corresponds to a physical space where the imaging device 104 is installed, such as a packing or transition zone in a processing facility. service provider 108

At 304, the process 300 may include normalizing the image data. The normalization of the image data enables mathematical manipulation of the image data received from the imaging device 104. In some examples, the normalization may be performed as part of digital image processing. In some examples, the image data may be processed using any suitable digital image processing technique such as by converting to a tensor. The image data is processed to enable identification of the label 110 within the image data.

At 306, the service provider 108 estimates a distance to the item 102. As described above, the distance may be estimated based on a known size of a label 110 or some other known dimension of the item that will be consistent across multiple items, not specifically tied to an item identity. As such, applied optically readable labels, such as inventory or shipping labels that may be used to track inventory and shipping may be used for the process 300 without requiring additional labels or markers. The size of the label 110 may be correlated to an estimated distance based on the apparent size of the label 110 within the image data. By relating the apparent size and the known size of the label 110, the service provider may estimate a distance to the item 102.

At 308, the process 300 includes the service provider 108 determining a new focal setting for the imaging device 104. The new focal setting may include the focal distance, a depth of field of the imaging device 104, or any other settings that impact a depth of items within the field of view of the imaging device 104 that are in focus. In some examples, the estimated distance is used in conjunction with a lookup table, a regression model, or predetermined settings for the imaging device 104 that correlate the focal distance with one or more settings of the imaging device 104, such as a voltage applied to a liquid lens or a mechanical motor position of a mechanical lens.

At 310, the process 300 include the service provider adjusting the imaging device 104 based on the new focal settings, to capture subsequent image data with a focused depth of field at or around the distance of the item 102 from the imaging device 104. The process 300 may be performed iteratively, with subsequent image data captured following the determination of new focal settings and further refinement of the estimated distance to the item.

In some examples, the process 300 may include one or more steps directed at determining whether the item 102 is within a threshold distance of the estimated distance. For example iterative processing of process 300 may further refine the focus settings, however, due to the depth of field including a range of distances, the item 102 may be sufficiently sharp or clear once within a threshold of the center of the focal distance. For instance, when the estimated distance from 306 of a previous iteration of process 300 is within ten percent of the estimated distance of a subsequent iteration of process 300, the service provider 108 may determine that the item 102 is sufficiently clear for image processing and cease iteration of process 300 and may move on to performing process 300 on additional items within the field of view.

Figure 4:
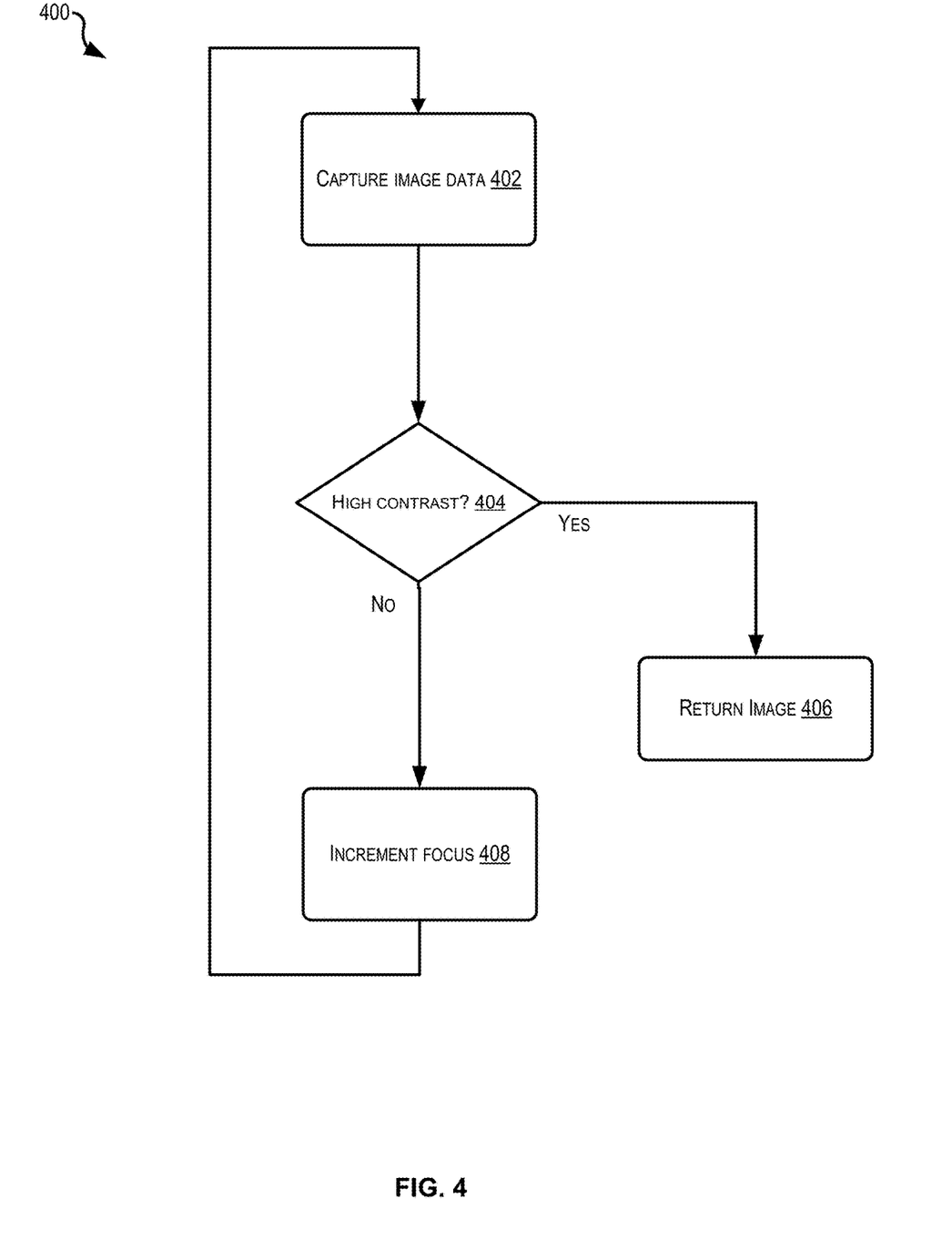
FIG. 4 is a flow diagram for a process to incrementally adjust image focus settings based on image contrast, according to at least one example.

FIG. 4 is a flow diagram for a process 400 to incrementally adjust image focus settings based on image contrast, according to at least one example. In contrast to the process 300 of FIG. 3, the process 400 may not rely on an estimated distance but may instead repeatedly iterate a focus refinement to reach a predetermined sharpness level within the image data. In some examples, the sharpness may be determined based on a contrast level within the image data. The sharpness threshold may be set based on a sharpness level required for identification of optical markers in the image data by image processing methods or optical readers. The process 400 may be performed by the service provider 108, for example implementing the lens adjustment engine 210.

The process 400 begins, at 402 with the service provider 108 receiving image data captured by the imaging device 104 as described with respect to 302 of process 300 described above.

At 404, the process 400 includes the service provider 108 performing a contrast evaluation of the image data. The image data may be processed by the service provider 108 to output a contrast profile of the image data. The contrast profile is indicative of the ratio between the maximum and minimum brightness within the image data. The contrast ratio may provide a guide for sharpness of the image, especially with respect to identifying darks and lights of optical codes such as QR codes and bar codes which are dependent on identifying differences between adjacent bars or blocks of different colors (e.g., identifying a differentiation between a black and a white bar). At 404, if the contrast level of the image data exceeds a threshold, the service provider may proceed to 406 for further processing. In the event the contrast does not meet or exceed the threshold, the process may proceed to 408.

At 406, the service provider 108 may process the image data for item recognition by reading or detecting the optical codes of the image data. As described above, such information may be used to uniquely identify an item 102 and identify a location of the item within a facility or processing flow.

AT 408, the service provider 108 may increment the focus setting of the imaging device 104 and return to 402 to iterate the process again with a different focus setting. The increment may be to increase or to decrease a focal distance of the imaging device 104. The service provider 108 may, in some examples, identify whether the image data is over or under focused and change the focus setting based on whether the item 102 is over or under focuses, similar evaluations may be performed in other processes described herein. The service provider 108 may increment by a predetermined amount, for example to increment by a step in the focal distance equal to the depth of field of the imaging device. The step may be less than the focal distance such that subsequent image data will overlap the depth of field of the previous image data by some amount. In some examples, the increment in focus may be by a variable amount, with the step increment in focus output by a machine learning algorithm based on the contrast determination, the image data, or other such inputs. In such a manner, the step increment in focal distance may be greater when the contrast level is far below the threshold or some other similar metric.

As with other processes described herein, after processing image data and adjusting focal settings, the object ID engine 214 may be used to identify the item 102 from the image data.

Figure 5:
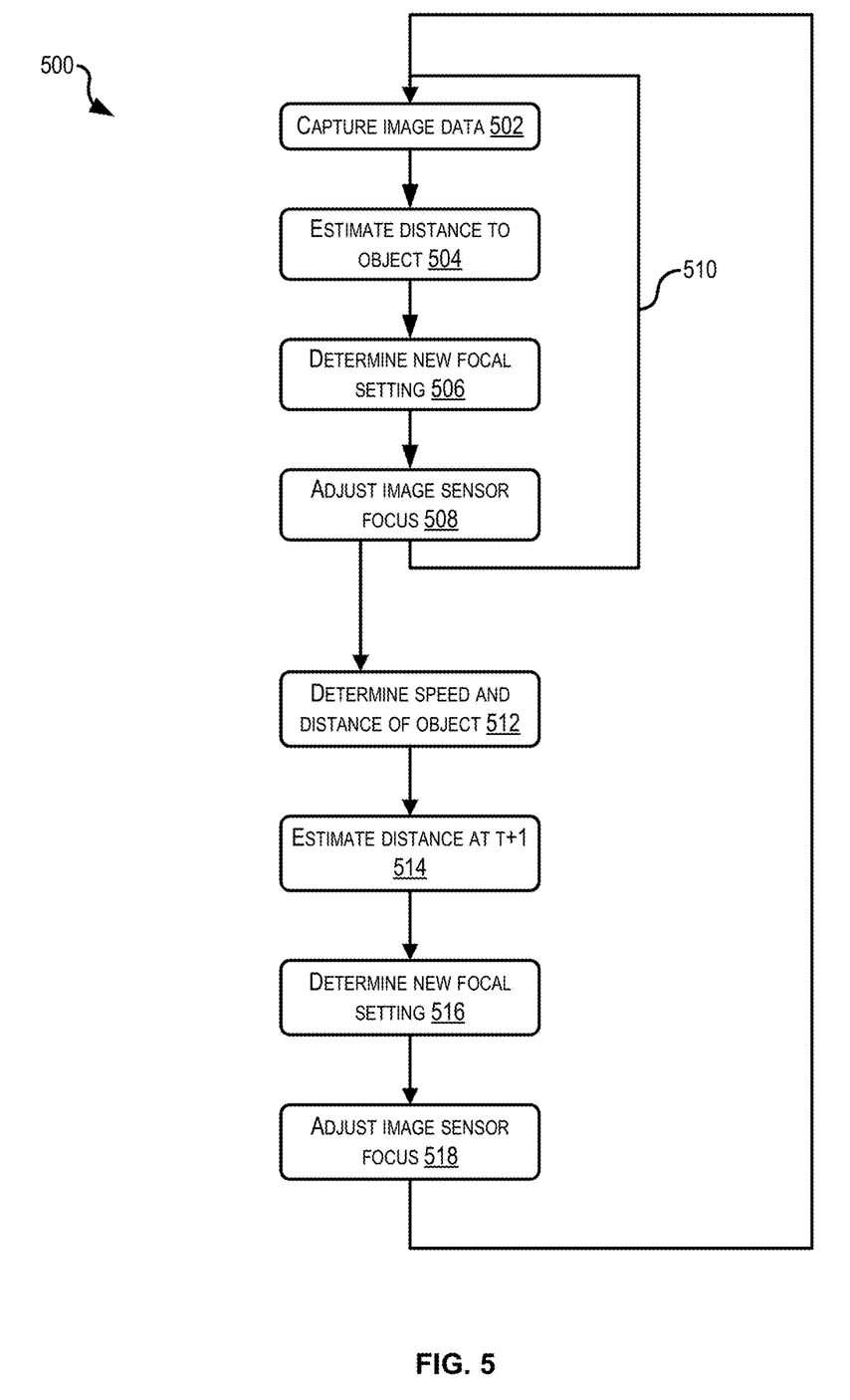
FIG. 5 is a flow diagram for a process to adaptively adjust imaging device focus settings and predict a focus setting based on an item distance and speed, according to at least one example.

FIG. 5 is a flow diagram for a process 500 to adaptively adjust imaging device focus settings and predict a focus setting based on an item distance and speed, according to at least one example. As with processes 300 and 400, process 500 is performed by the service provider 108 and in particular by the lens adjustment engine 210 and the object ID engine 214. FIG. 5 begins with blocks 502, 504, 506, and 508 that correspond to blocks 302, 306, 308, and 310 of FIG. 3 described above. The steps performed at each of blocks 502, 504, 506, and 508 may be identical to those described with respect to FIG. 3.

In FIG. 5, the process 500 includes performing the first steps at least twice, by performing loop 510 iteratively, e.g., at least twice, before proceeding to 512. In this manner, the process 500 includes gathering first and second image data at a first and a second focus setting for the imaging device, the second image data gathered using the adjusted focus setting determined from the first image data. The time difference between the first and the second image data may be noted, for example with a first time stamp and a second time stamp for the first and second image data, respectively.

At 512, the process 500 includes the service provider 108 determining a speed or a change in distance of the item 102 between the first item data and the second item data. The estimated distance from the two iterations of loop 510 as well as the time difference between the iterations is used to calculate the speed of the item 102. The speed may be a vector, or may be a speed towards or away from the imaging device 104, for example as a component along an axis aligned with the imaging device of the overall velocity of the item 102. The speed of the item 102 may be determined in the direction the imaging device 104 is pointed because the speed of the item 102 towards or away from the imaging device 104 will impact whether the item falls within the depth of field of the current focal setting of the imaging device 104. The lateral motion may not impact whether the item 102 is in the depth of field or now.

At 514, after the speed of the item 102 is calculated, an estimated distance of the item at a future time is predicted, based on the item speed and the time increment. The calculation may be a simple calculation of the distance determined as a result of time elapsed multiplied by the rate of speed towards or away from the imaging device 104.

The service provider 108 may determine, at 516, new focal settings based on the predicted distance at the future time. The new focal setting may be determined based on the distance using any technique described herein.

At 518, the process 500 includes the service provider 108 instructing adjustment of the focus setting of the imaging device 104 and returning the process 500 to 502 where image data is captured at the predicted time and with the focal setting set to the predicted distance.

In some examples, process 500 may be repeated iteratively such that third, fourth, fifth, and so on sets of image data may be gathered. With the additional sets of image data, additional information may be calculated to determine an estimated position of the item 102. For example, after gathering third image data, at 512, the speed as well as the acceleration may be calculated. After fourth image data is gathered then speed, acceleration, and jerk may be calculated, after fifth image data then speed, acceleration, jerk, and jounce may be calculated, and so on with additional iterations.

FIG. 6 is an example item label 600 and associated flowchart showing a process 602 for processing the item label using a deblurring algorithm, according to at least one example. The process 602 may be performed by the service provider 108, for example using the deblur engine 212. The deblur engine, and the process 602 may be performed on image data gathered using imaging device 104 and may be implemented following any of processes 300, 400, and 500. The label 110 of the item 102 is identified from the image data and cropped into segments, such as illustrated by grid 612 for processing by the GPU in parallel to deblur and decode the optical identifier (barcode).

At 604, the label 110 is identified from the image data by the deblur engine 212, for example using a template matching, object recognition, or other such algorithm. The identified label 110 may, even after processes 300, 400, or 500 still not be sufficiently clear for processing the barcode and attempting to process may cause a failure that results in proceeding to process 602 either in parallel with an iteration of processes 300, 400, or 500 or as a final step.

At 606, the process 602 includes cropping the label 110 into the grid 612 to break the label 110 into smaller sections for processing. In some examples, only elements of label 110 identified as including the optical code (barcode) may be processed to preserve computing resources. In some examples, all may be processed simultaneously at 608. In some examples, the label 600 and process 602 may be performed without cropping the label 600 or segmenting into smaller images for processing and may instead be processed as described below as a whole.

At 608, the process 602 includes deblurring the segments in parallel by using a deblur algorithm of the deblur engine 212. The deblur algorithm may sharpen imaged by reducing out-of-focus blur. One such example may include a Wiener filter that receives a signal-to-noise ratio and a kernel size, determines a blur kernel, removes noise, and deconvolutes the image using the inverse of the deblur kernel. Various different signal-to-noise ratios and kernel sizes may be fed to the Wiener filter to produce a variety of results and select one or more that have a contrast above a threshold or are otherwise determined to be sharp. The deblur algorithm may be processed using a GPU of the service provider 108 rather than a CPU of the service provider 108.

At 610, the label 110 is decoded, such as by reading the optical code (barcode) to uniquely identify the item 102 as described herein.

Figure 7:
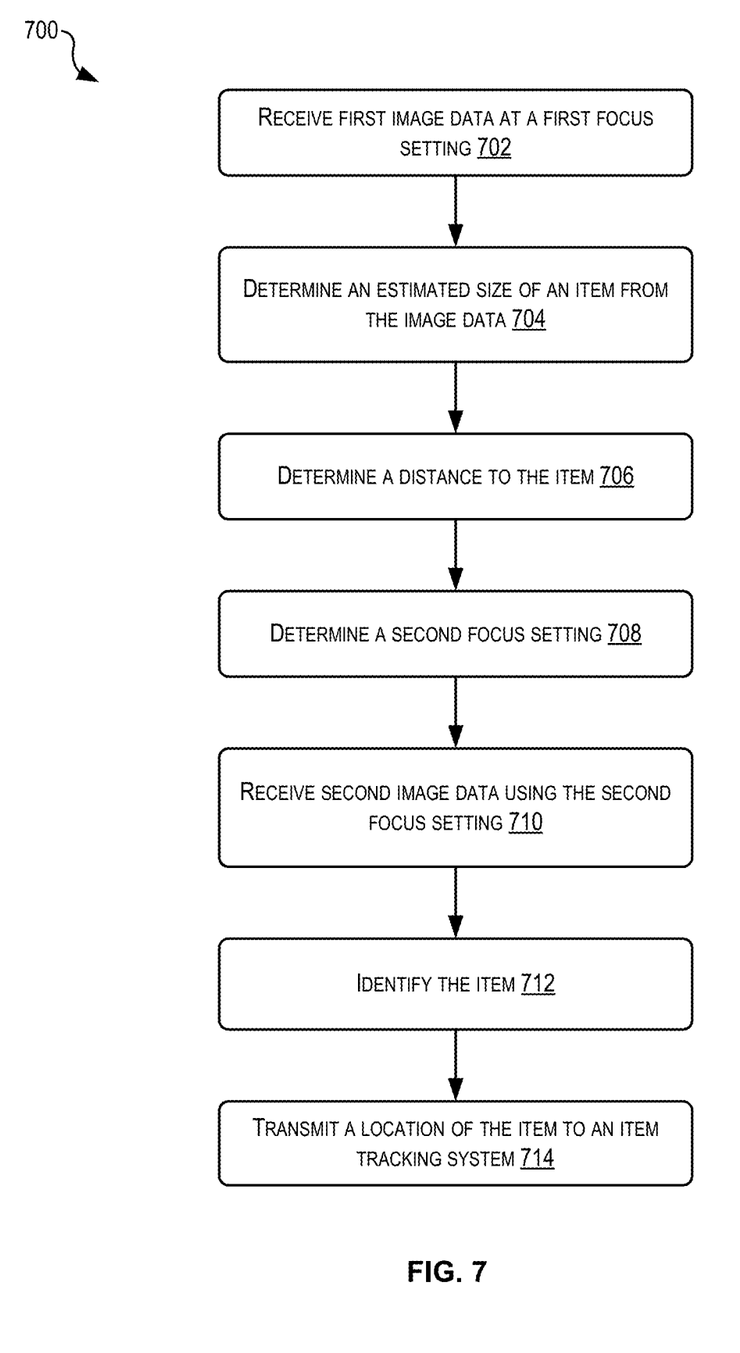
FIG. 7 is a flow diagram of a process for continuously adaptively adjusting focus settings of an imaging device for item identification and tracking, according to at least one example.

FIG. 7 is a flow diagram of a process 700 for continuously adaptively adjusting focus settings of an imaging device for item identification and tracking, according to at least one example. The process 700 may be performed by the service provider 108 using one or more of the object ID engine 214, the deblur engine 212, and/or the lends adjustment algorithm 210.

At 702, the process 700 includes the service provider 108 receiving first image data a first focus setting. the first image data may be received as described with respect to block 302 of FIG. 3, block 402 of FIG. 4, or block 502 of FIG. 5. The first focus setting may be an arbitrary setting, a preset first setting programmed for use, for example based on a frequent focal distance determined by the service provider 108 for the particular imaging device 104 at the particular location.

At 704, the process 700 includes the service provider 108 determining an estimated size of an item from the first image data. The estimated size of the item may include determining the estimated size of label 110 as described herein. The estimated size may be determined based on a pixel size, such as a width and length of the label 110 as measured in pixels and estimated to a measurement such as inches or centimeters. Other measurement systems may be implemented, so long as they may be related to the known size of the label 110.

At 706, the process 700 includes the service provider 108 determining a distance to the item 102, in the manner described with respect to FIG. 3 above, especially at block 306, by correlating the estimated size and the known size of the label 110.

At 708, the process 700 includes the service provider 108 determining a second focus setting. The second focus setting is based on the distance to the item 102. The distance to the item 102 may be correlated to a focal setting of the imaging device 104 based on a predetermined correlation, regression model, lookup table, or other such correlation to distance and depth of field or focus distance for the imaging device 104.

At 710, the process 700 includes the service provider 108 receiving second image data using the second focus setting. The second image data is received from the imaging device 104 as described herein. The second image data may include the item 102 in focus in some examples. In some examples, the process 700 may include performing an analysis to determine whether the item 102 is sufficiently sharp for item identification techniques, such as optical scanning of a code or marker by analyzing contrast ratios or other such metrics of the second image data. In some examples, further refinement of the focus setting may be performed as described herein, including some processes to gather additional image data and other processes to computationally deblur the second image data.

At 712, the process 700 includes the service provider 108 identifying the item based on the second item data, for example by optically scanning the label and the object ID engine 214 accessing the database 236 to identify a corresponding data packet describing the item associated with the optical code.

At 714, the process 700 includes the service provider 108 transmitting a location of the item to an item tracking system. The item tracking system may, for example, include a system for tracking shipments from a warehouse facility or for tracking cars within a paid parking facility.

In some examples, the process 700 may include additional actions in place of 712 and 714, for example, including identifying individuals using face identification and performing an action based on the face identification (e.g., tracking a location, providing access to a secure region, etc.). In some examples, the objects identified through process 700 may be used for object tracking, object identification, or any other downstream uses that rely on object tracking and/or identification.

Figure 8:
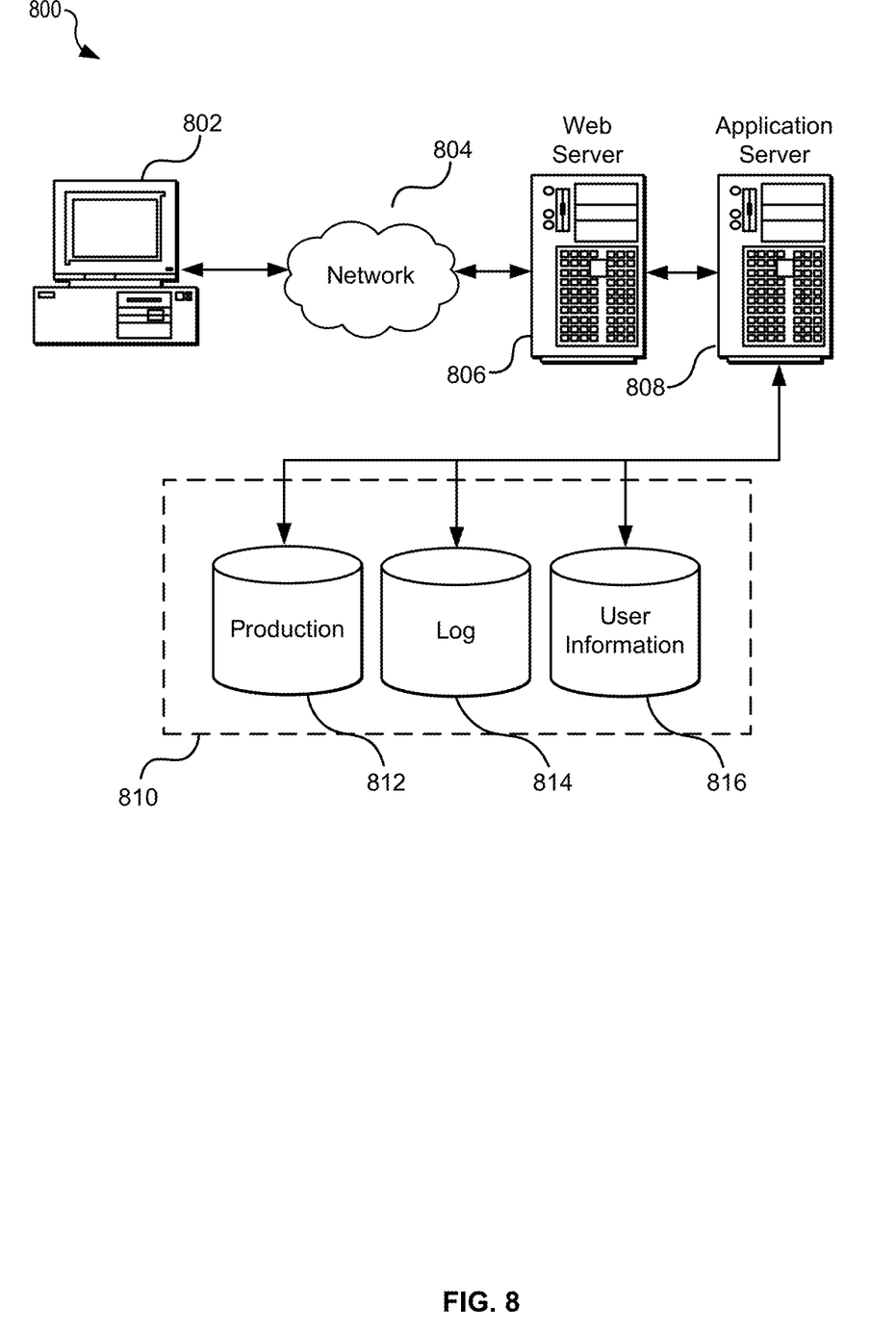
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for capturing focused images of moving items at varying depths in a field of view, the system comprising:
   an imaging device configured to adjust a focus setting of the imaging device, the imaging device configured to capture image data representative of the field of view;
   a memory configured to store computer-executable instructions; and
   a processor configured to access the memory and execute the computer-executable instructions to at least:
      receive first image data from the imaging device using a first focus setting;
      determine an estimated size of a marker of an item within the first image data, the marker having identifying information that uniquely identifies the marker among a plurality of markers that are collectively associated with a known marker size;
      determine a distance from the imaging device to the item based at least in part on comparing the known marker size with the estimated size;
      determine a second focus setting based at least in part on the distance;
      alter the focus setting of the imaging device based on the second focus setting; and
      acquire focused image data of the item using the imaging device and the second focus setting.

2. The system of claim 1, wherein the computer-executable instructions to determine the identifying information of the marker comprise further instructions that, when executed, cause the processor to additionally:
   determine that the identifying information is unreadable in the focused image data;
   determine, in response to the identifying information being unreadable, a second distance from the imaging device to the item at a second time, wherein the distance that is determined based at least in part on the first image data is determined at a first time;
   determine an estimated velocity of the item between the first time and the second time;
   determine, based on the estimated velocity, an estimated third distance at a third time;
   determine a third focus setting based at least in part on the estimated third distance;
   alter the focus setting based at least in part on the third focus setting;
   receive third image data from the imaging device using the third focus setting at the third time; and
   determine the identifying information of the marker based at least in part on the third image data.

3. The system of claim 1, wherein the computer-executable instructions to determine the identifying information of the marker comprise further instructions that, when executed, cause the processor to additionally:
   determine that the identifying information is unreadable in the focused image data;
   adjust the focused image data using a deblur algorithm in response to determining that the identifying information is unreadable; and
   determine the identifying information of the marker from the adjusted focused image data.

4. The system of claim 3, wherein the imaging device comprises a liquid lens.

5. A computer-implemented method, comprising:
   receiving first image data from an imaging device having a first focus setting;
   determining an estimated object size of an item represented in the first image data the item being a type that is associated with a known item size;
   determining a distance to the item based at least in part on comparing the known item size with the estimated object size;
   determining a second focus setting for the imaging device; and
   acquiring second image data representing a clear image of the item with the imaging device using the second focus setting.

6. The computer-implemented method of claim 5, wherein determining an identity of the item based at least in part on the second image data comprises:
   determining that a portion of the second image data corresponding to the item is out of focus;
   adjusting a parameter of the second image data using a deblurring algorithm to produce sharpened second image data; and
   determining the identity of the item from the sharpened second image data.

7. The computer-implemented method of claim 5, wherein determining an identity of the item comprises identifying a unique identifier of the item.

8. The computer-implemented method of claim 5, further comprising
  determining that a portion of the second image data corresponding to the item is out of focus;
  determining an estimated item velocity based at least in part on the first image data and the second image data;
  determining, based at least in part on the estimated item velocity, a third focus setting for the imaging device; and
  receiving third image data from the imaging device using the third focus setting, and wherein determining an identity of the item is further based on the third image data.

9. The computer-implemented method of claim 8, wherein determining the third focus setting comprises:
  determining an estimated position of the item based at least in part on the estimated item velocity, and wherein determining the third focus setting is further based on the estimated position of the item.

10. The computer-implemented method of claim 8, wherein determining the identity of the item comprises providing the first image data, second image data, and third image data to a machine learning algorithm configured to output sharpened image data of the item.

11. The computer-implemented method of claim 5, wherein determining an identity of the item based at least in part on the second image data comprises:
  determining that a portion of the second image data corresponding to the item is out of focus;
  determining a difference between the distance and a second distance to the item at a second time, the second distance determined from the second image data; and
  adjusting a parameter of the second image data based on the difference between the distance and the second distance.

12. The computer-implemented method of claim 11, wherein adjusting the parameter comprises providing the difference to a machine learning algorithm trained using data tagged with over and over focus settings, the machine learning algorithm configured to output sharpened second image data.

13. The computer-implemented method of claim 5, wherein the imaging device comprises a liquid lens.

14. The computer-implemented method of claim 13, wherein determining the second focus setting comprises using a lookup table correlating a plurality of distances with a corresponding plurality of focus settings of the liquid lens.

15. A non-transitory computer-readable medium having instructions stored thereon that, upon execution by one or more processors, cause the one or more processors to:
  receive first image data from an imaging device having a first focus setting;
  determine an estimated object size of an item represented in the first image data, the item being a type that is associated with a known item size;
  determine a distance to the item based at least in part on comparing the known item size with the estimated object size;
  determine a second focus setting for the imaging device; and
  acquire second image data from the imaging device using the second focus setting.

16. The non-transitory computer-readable medium of claim 15, wherein the instructions to determine an identity of the item comprise further instructions that, when executed, cause the one or more processors to:
  determine that a portion of the second image data corresponding to the item is out of focus;
  adjust a parameter of the second image data using a deblurring algorithm to produce sharpened second image data; and
  determine the identity of the item based at least in part on the sharpened second image data.

17. The non-transitory computer-readable medium of claim 15, wherein the instructions comprise further instructions that, when executed, cause the one or more processors to additionally:
  determine that a portion of the second image data corresponding to the item is out of focus;
  determine an estimated item velocity based at least in part on the first image data and the second image data;
  determine, based on the estimated item velocity, a third focus setting for the imaging device; and
  receive third image data from the imaging device using the third focus setting, and wherein determining an identity of the item is further based on the third image data.

18. The non-transitory computer-readable medium of claim 15, wherein the imaging device comprises a liquid lens having a focus setting adjustable by changing a voltage applied to a liquid meniscus of the liquid lens.

19. The non-transitory computer-readable medium of claim 18, wherein the instructions to determine the second focus setting comprise further instructions that, when executed, cause the one or more processors to:
  access a database of focus distances corresponding to a plurality of voltage settings; and
  select the voltage based at least in part on the distance corresponding to one of the focus distances.

20. The non-transitory computer-readable medium of claim 15, wherein the instructions to determine an identity of the item comprise further instructions that, when executed, cause the one or more processors to:
  determine, using an image recognition algorithm, the identity of the item based at least in part on the second image data.

* * * * *

UNITED STATES PATENT AND TRADEMARK OFFICE
CERTIFICATE OF CORRECTION

PATENT NO. : 11,350,024 B1
APPLICATION NO. : 17/192392
DATED : May 31, 2022
INVENTOR(S) : Stallman et al.

Page 1 of 1

It is certified that error appears in the above-identified patent and that said Letters Patent is hereby corrected as shown below:

On the Title Page

Item (72), Inventors, should read:
Timothy Stallman, Groton, MA;
Frank Preiswerk, Brooklyn, NY;
Michael R. Calder, Westborough, MA;
Hieu Minh Le, Malden MA;

Signed and Sealed this
Twenty-third Day of August, 2022

Katherine Kelly Vidal
*Director of the United States Patent and Trademark Office*